United States Patent

[11] 3,611,131

[72] Inventors Andre Burkhart
187 Avenue du Maine, 75-Paris 14eme;
Francois Guillot, 1 Rue du Parc du Moulin
de Chamois, 91-Etampes; Andre Vitez, 15
Domaine du Chanteloup, 91-Saint Germain
les Arpajon, all of France
[21] Appl. No. 807,215
[22] Filed Mar. 14, 1969
[45] Patented Oct. 5, 1971
[32] Priority Mar. 15, 1968, Feb. 27, 1969
[33] France
[31] 144111 and 6905193

[54] INSTRUMENT HAVING HIGH DYNAMIC SENSITIVITY FOR THE MEASUREMENT OF DIRECT-CURRENT VOLTAGES OR CURRENTS
11 Claims, 3 Drawing Figs.
[52] U.S. Cl. ..................................... 324/115, 324/132
[51] Int. Cl. ..................................... G01r 15/08, G01r 15/10
[50] Field of Search ........................... 324/132, 115; 328/144, 145

[56] References Cited
UNITED STATES PATENTS
3,041,535  6/1962  Cochran ..................... 324/132 X Primary Examiner—Rudolph V. Rolinec
Assistant Examiner—Ernest F. Karlsen
Attorney—Craig, Antonelli & Hill ABSTRACT: An instrument for measuring direct-current voltages or currents comprising an amplification chain, a linear negative feedback chain and a logarithmic negative feedback chain which are associated with said amplification chain, a device for reading the voltage delivered by said amplification chain, means for automatic switching of the operating zone of the instrument and means for displacing the reading device in order to ensure continuity of reading in spite of any switching of the operating zone.

INSTRUMENT HAVING HIGH DYNAMIC SENSITIVITY FOR THE MEASUREMENT OF DIRECT-CURRENT VOLTAGES OR CURRENTS

The present invention relates to an instrument having high dynamic sensitivity for measuring direct-current voltages or currents which is particularly well suited to the measurement of low currents having minimum values, for example, of the order of $10^{-14}$ amp.

An instrument of this type proves very useful in physics, in biology, in radiation protection, in the astronautical engineering field and is of considerable interest if it has the advantages of small overall size, low cost price, ease and rapidity of utilization.

In order to satisfy requirements in the fields referred to above, a measuring instrument must usually be capable of taking a highly accurate measurement but must also take into account the high current or voltage peaks which are liable to arise during measurement operations. It is therefore necessary to provide for a change in sensitivity although it is not permissible to contemplate manual change over.

Instruments of this type which are at present known necessarily make use of high-impedance input elements, namely either electrometer tubes or transistors of the insulated control electrode type.

Electrometer tubes entail the need for a special heating device; they exhibit drift in time and have a range with a logarithmic detection characteristic which is limited to six decades.

Transistors with insulated control electrodes have a very high input impedance ($10^{15}\Omega$) which makes them theoretically suited to the measurement of very low currents or voltages but they do not permit any overvoltage on their control electrodes. In addition, it is necessary to incorporate a logarithmic characteristic component in these transistors if it is desired to avoid a large number of range changes (this function being usually carried out by the emitter-base junction of a silicon "planar" transistor); but in this case, the logarithmic component no longer permits measurement of currents and voltages of very low values if it does not provide exceptional performances which limit leakage.

The invention proposes an instrument having a wide dynamic range for the measurement of low direct-current voltages or currents which has the advantages of small over all size, low cost price, ease and rapidity of utilization while permitting without either manual switching or discontinuity the accurate measurement of low currents or voltages which are liable to attain high peak values, said instrument being wholly compensated for variations in temperature and offering every guarantee of reliability at the time of utilization.

The instrument in accordance with the invention comprises:
an amplification chain,
a linear negative feedback chain and a logarithmic negative feedback chain which are associated with said amplification chain,
and a device for reading the voltage supplied by said amplification chain, and is mainly characterized in that it comprises means for automatic switching of its operating zone and elements for displacing the reading device in order to ensure continuity of reading in spite of any switching of the operating zone.

Three embodiments can be contemplated.

In the first embodiment, the linear negative feedback chain and the logarithmic negative feedback chain are in parallel between the input and the output of the amplification chain and said automatic switching means comprise a switching device for putting into service either said linear negative feedback chain or said logarithmic negative feedback chain and a threshold circuit for controlling said device which is connected at the output of the amplification chain in order to initiate the operation of the linear negative feedback chain when the output voltage of the amplification chain is lower than a predetermined value and the operation of the logarithmic negative feedback chain when said voltage is higher than said predetermined value.

In the second embodiment referred to,

—the reading device comprises a linear-scale-reading stage and a logarithmic-scale-reading stage, said stages being capable of operating simultaneously, —the amplification chain comprises two amplifying circuits, the first circuit being connected to the linear reading stage and the linear negative feedback chain being connected between its input and its output, the second amplifying circuit being connected to the logarithmic-reading stage and the logarithmic negative feedback chain being connected between its input and its output, —the linear negative feedback chain comprises a plurality of resistive element arms in parallel, —and said automatic switching means comprise at least one switching device for putting into service different arms of the linear negative feedback chain and at least one threshold circuit for controlling said device and connected at the output of the second circuit of the amplification chain in order to initiate the operation of predetermined arms of the linear negative feedback chain in response to a predetermined value of the output voltage of the amplification circuit.

In the third embodiment referred to,

—the reading device comprises a linear-scale-reading stage and a logarithmic-scale-reading stage, said stages being capable of operating simultaneously, —the amplification chain comprises two amplifying circuits, the first circuit being connected to the linear-reading stage and the linear negative feedback chain being connected between its input and its output, the second amplifying circuit being connected to the logarithmic-reading stage and the logarithmic negative feedback chain being connected between its input and its output, —the linear negative feedback chain comprises a plurality of capacitive elements in series having different values, —and said automatic switching means comprise at least one switching device for short circuiting one of said capacitive elements and at least one threshold circuit for controlling said device and connected at the output of the second circuit of the amplification chain in order to short circuit said capacitive element of the linear negative feedback chain in response to a predetermined value of the output voltage of the amplification circuit.

Thus, the instrument in accordance with the first embodiment operates either in linear reading or in logarithmic reading, the change over from one to the other being carried out automatically at a given value of the measurable variable. On the other hand, the instrument in accordance with the second and third embodiments operates simultaneously in linear reading and logarithmic reading while the automatic switching takes place only in order to modify the ranges of sensitivity of linear reading. Finally, the instrument in accordance with the third embodiment can additionally carry out an integration of the electric charges applied to its input.

Further properties and advantages of the instrument in accordance with the invention will become apparent from the following description which is given by way of non limitative example and relates to the accompanying drawings, in which.

Figure 1:
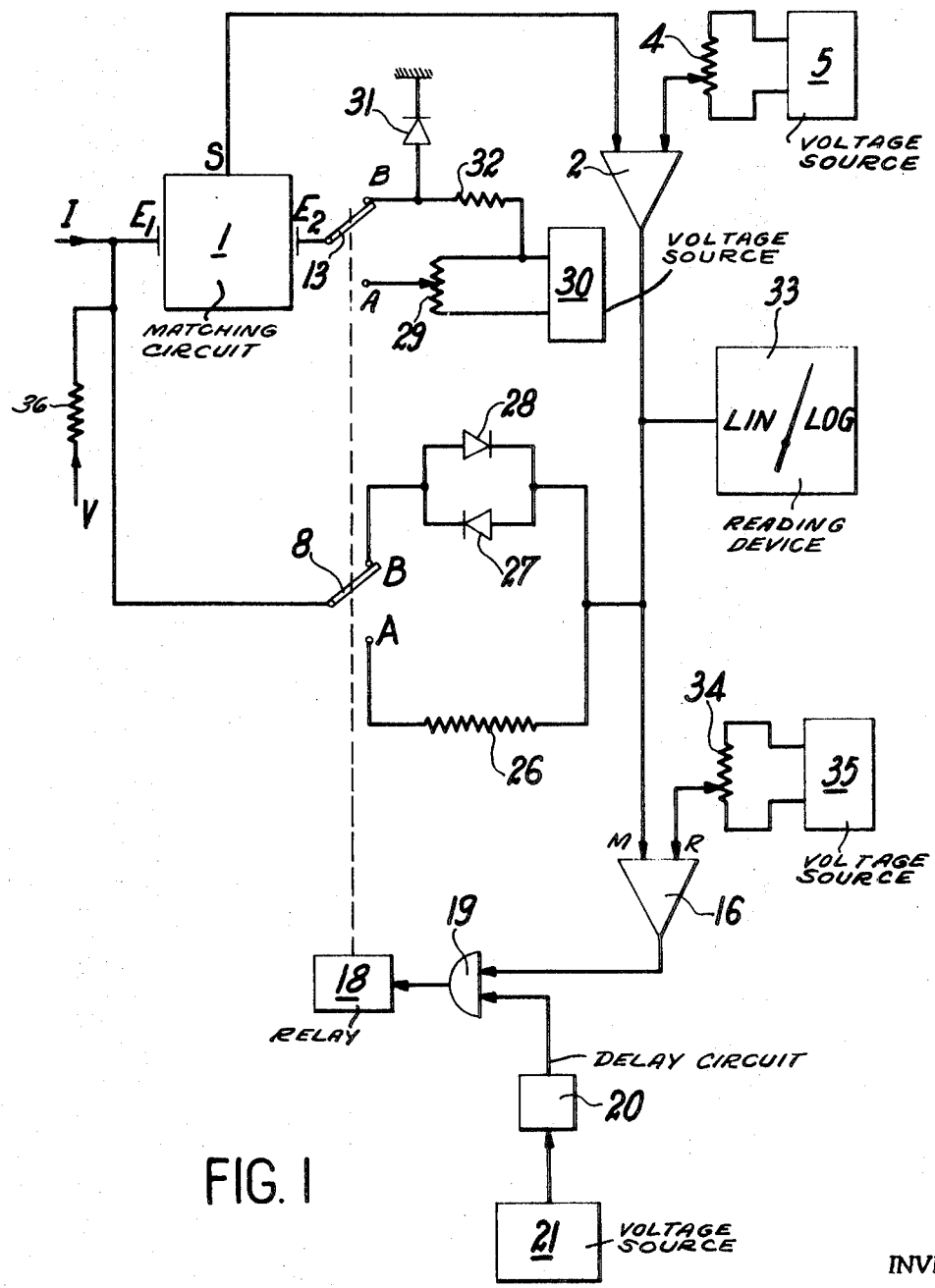
FIG. 1 is a block diagram of an instrument in accordance with the first embodiment.

As shown FIG. 1, the current I to be measured is applied to the insulated input $E_1$ of an impedance matching circuit 1 which can be of the type described in the French patent 1520432 present entitled "Instrument for the logarithmic measurement of quantities of charges delivered by an ionization chamber."

The circuit is made of a symmetrical connection of two identical transistors having an insulated grid. The insulated input $E_1$ constitutes the grid of one of these transistors, whereas the grid of the other makes up the insulated input $E_2$; the second input is a measuring input and serves to compensate for thermal deviations in the apparatus. The output S of this matching circuit is coupled to an amplifier 2 which is preferably of the integrated circuit type. A potentiometer 4 connected to the terminals of a voltage source 5 permits the calibration of said amplifier. A linear negative feedback of resistor 26 and a logarithmic feedback chain consisting of two diodes 27 and 28 mounted in top-to-tail relation are connected in parallel between the output of the amplifier 2 and the input $E_1$ of the matching circuit 1. A change over switch 8 serves to put into service either the linear negative feedback chain (position A) or the logarithmic negative feedback chain (position B). A potentiometer 29 which is connected to the terminals of a voltage source 30 is connected by means of its movable terminal to the insulated input $E_2$ which is symmetrical with the input $E_1$ of the matching circuit 1. A diode 31 which is biased through a resistor 32 by means of the voltage source 30 is also connected to the input $E_2$. A second changeover switch 13 serves to put into service either the potentiometer 29 (position A) or the diode 31 (position B).

The voltage at the output of the amplifier 2 is read by a reading device 33 having direct-current linear and logarithmic scales. Said amplifier is also connected at the output to the measuring input M of a threshold amplifier 16.

As can be seen in FIG. 1, the threshold amplifier 16 is of the differential amplifier type, having one input connected to the output of amplifier 2 and the other input connected to receive a voltage level determined by the setting of the potentiometer 34. By varying the position of the wiper arm of potentiometer 34, the voltage threshold supplied by source 35 through potentiometer 34 to one arm of the amplifier 16 will determine the potential at which the output of amplifier 2 must reach before a triggering output will be provided by amplifier 16 to gate 19.

Said level is chosen as a function of the boundary between the linear and logarithmic scales of the reading device 33 : a voltage below the threshold is read from the linear scale and a voltage above said threshold is read from the logarithmic scale.

The threshold amplifier 16 delivers a signal for cutting off an inhibitory gate 19 which is interposed on the one hand between a relay 18 and on the other hand a time control circuit 20 which is connected to the output of a voltage source 21. When the relay 18 is energized, that is to say when the amplifier 16 does not deliver any cut off signal, it maintains the change over switches 8 and 13 in position A. When the relay 18 is not energized, that is to say when the amplifier 16 delivers a cut off signal, it maintains said switch at the same time in position B. The delay imposed by the circuit 20 makes it possible at the time of putting into service of the instrument to prevent any premature operation which would be liable to damage the matching device 1 and the reading device 33.

The operation of the instrument under consideration is as follows. Initially, a source of current to be measured is connected to the input $E_1$ of device 1, prior to turning on the system. The instrument is then turned on, causing appropriate voltages to be delivered throughout the circuit and, simultaneously, voltage source 21 is turned on. When the instrument is switched on, the relay 18 is not energized and the switches 8 and 13 remain in position B irrespective of the value of the current I which is applied during the period corresponding to the time-delay introduced by the circuit 20. In this manner, the system will be protected from an undesirably large current being applied at input terminal $E_1$ by maintaining the reading of meter 33 on the logarithmic scale until the end of the period governed by delay 20. If, at the end of said period, the measured current does not attain a value such that the threshold level of the amplifier 16 is reached, said amplifier does not deliver the signal for blocking the gate 19 and the relay 18 is energized : the switches 8 and 13 therefore change over to position A, thus putting into service respectively the linear negative feedback resistor 26 and the potentiometer 29. The reading device 33 then operates on its linear scale, that is to say within its lowest measuring range. On the other hand, if the measured current has a value such that the threshold level is attained, the amplifier 16 cuts off the gate 19 and the relay 18 is no longer energized. The switches 8 and 13 therefore change over to position B, thus putting into service respectively the two diodes 27 and 28 of the logarithmic negative feedback chain and the diode 31; the intended function of said diode 31 is to provide compensation for effects arising from heating of the diodes 27 and 28. The reading device 33 accordingly operates on its logarithmic scale, that is to say within its highest measuring range. Moreover, at the moment of switching to position B, the countervoltage which was supplied by the source 30 by means of the potentiometer 29 is no longer applied to the input $E_2$ of the matching device 1. This has the effect of modifying the voltage at the input of the amplifier 2 in order that, as a result of displacement of the voltage applied to the input of the reading device 33, continuity of reading is ensured in spite of the modification of the amplification parameters (changeover from linear negative feedback to logarithmic negative feedback).

It is important to note that the logarithmic negative feedback chain is connected to the input of the matching device 1 at the time of switching-on. Thus, the apparatus is always within the highest measuring range at the outset, thereby preventing any damage to the impedance-matching device 1 and to the reading device 33.

The instrument which is designed as hereinabove described can permit the measurement of currents having values ranging from $10^{114}$ to $10^{18}$ amp, for example, while the value of the threshold of the amplifier 16 may be established according to the characteristics of the reading device so that the signal which cuts off the gate 19 should appear when the measured current attains $10^{111}$ amp. The measurement of currents having values between $10^{114}$ and $10^{111}$ amp is therefore carried out with the linear negative feedback while the measurement of current values between $10^{111}$ and $10^{18}$ amp is carried out with the logarithmic negative feedback without thereby entailing any need for manual switching.

It is apparent that if it is desired to measure a direct-current voltage V, this latter is applied to the input $E_1$ of the matching device 1 through a resistor 36, the operation of the instrument being identical.

Figure 2:
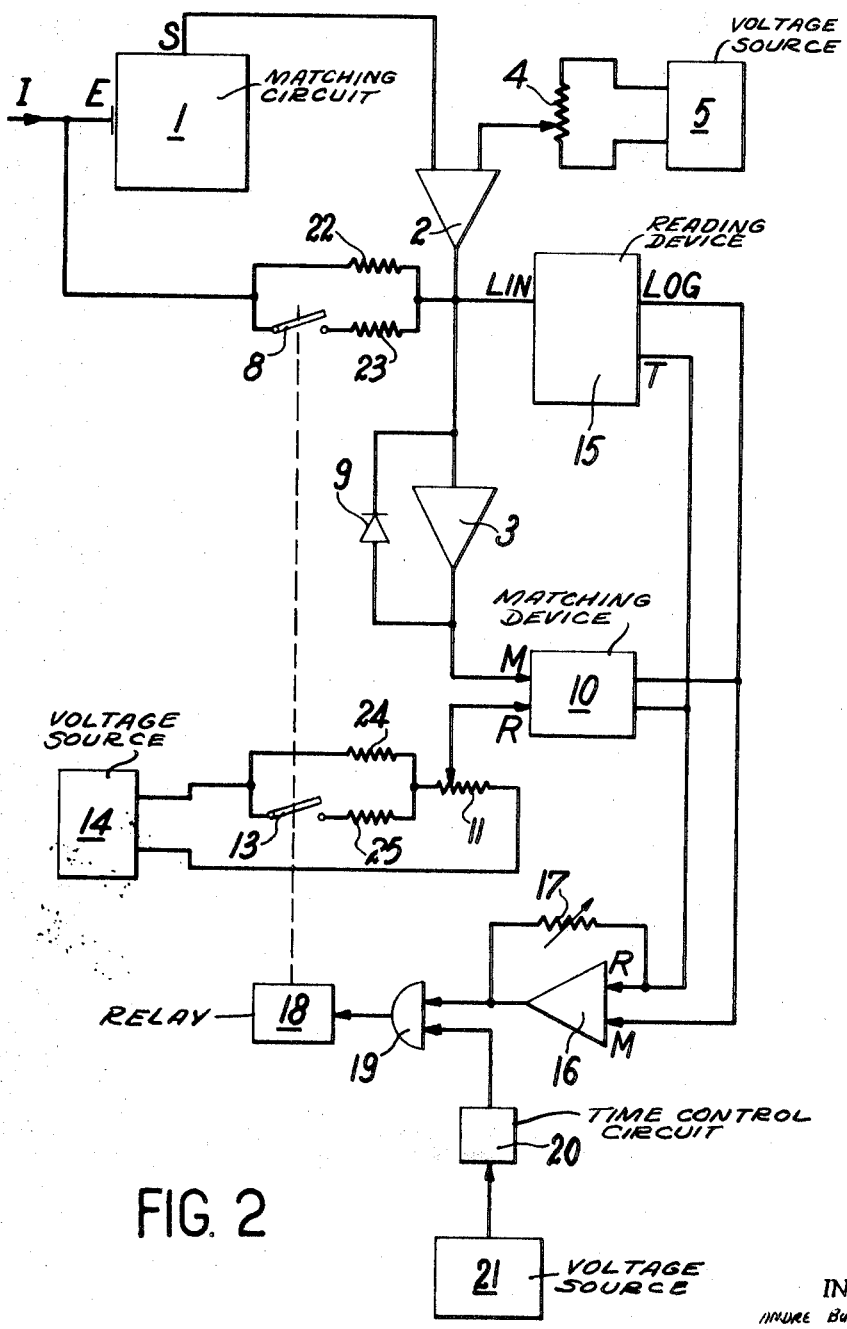
FIG. 2 is a block diagram of an instrument in accordance with the second embodiment.

Fig. 2 is a diagrammatic representation of an instrument according to the second form of embodiment. The instrument comprises elements which have the same function as some elements of the instrument shown in FIG. 1; these common elements are designated by the same reference numerals. The current I to be measured is applied to the insulated input $E_1$ of the impedance-matching device 1 whose output S is connected to an amplification chain. Said chain comprises two series-connected amplifiers 2 and 3. Calibration of the amplifier 2 is carried out by means of the potentiometer 4 which is connected to the terminals of the voltage source 5. A linear negative-feedback chain is connected between the output of the amplifier 2 and the input $E_1$ of the matching device 1 and comprises two arms in parallel consisting in one case of a resistor 22 and in the other case of a resistor 23 in series with the changeover device 8 which has solely a switching function. A logarithmic negative feedback chain is connected between the output and input of the amplifier 3 and comprises a diode 9 constituted by the emitter-base junction of a transistor formed on a temperature-stabilized substrate.

The amplifier 3 is connected at its output to the measuring input M of a symmetrical amplifier 10. Such an adapter has been described in the notice S.G.S. Fairchild, second edition, Aug. 1967, Page 75, section A13, in an article entitled "Application of Linear Circuit," and in the publication by Burr-Brown, 1963, entitled "Handbook of Operational Amplifier Applications." A calibrating potentiometer 11 and a circuit comprising in parallel on the one hand a resistor 24 and on the other hand a resistor 25 in series with the changeover device 13 which performs the function of a switch are connected in series to the terminals of a voltage source 14. The movable terminal of the potentiometer 11 is connected to the reference input R of the matching device 10. There is shown diagrammatically at 15 a reading device having a linear stage and a logarithmic stage which are capable of operating simultaneously. The input of the linear stage "L I N" is connected to the output of the amplifier 2 while the input of the logarithmic stage "L O G" is connected to the output of the measuring arm of the matching device 10. The output of the reference arm of said matching device is connected to the calibration input T of the logarithmic-reading stage.

The threshold amplifier 16, the threshold level of which is established by a variable negative feedback resistor 17 receives at its measuring input M the voltage derived from the measuring arm of the matching device 10 and at its reference input R the voltage derived from the reference arm of said matching device. Said amplifier delivers the signal for cutting off the gate 19 which is interposed between on the one hand the relay 18 and on the other hand the time control circuit 20 which is connected to the voltage source 21. When the relay 18 is energized, the switches 8 and 13 are opened simultaneously.

The operation of this instrument is as follows. At the time of initial operation, the relay 18 is not energized and the two switches 8 and 13 remain closed irrespective of the value of current I which is applied during the period corresponding to the time delay introduced by the circuit 20. If the measured current does not have a value such that the threshold level of the amplifier 16 is attained, said amplifier does not deliver the cutoff signal to the gate 19 and the relay 18 is energized. The switches 8 and 13 therefore open and leave respectively in service only the resistors 22 and 24. The current I is then read simultaneously by the linear-reading stage which operates within its lowest range of sensitivity (corresponding to a negative feedback in which only the resistor 22 is employed) and by the logarithmic-reading stage. A voltage which is determined by the resistor 24 is applied to the calibration input T of the logarithmic stage in order to match this latter during operation of the instrument with the single resistor 22 in the linear negative feedback chain. On the other hand, if the value of the measured current is such that the threshold level is attained, the amplifier 16 cuts off the gate 19 and the relay 18 is no longer energized: the switches 8 and 13 therefore close and put into service respectively the resistors 23 and 25. The current is then read simultaneously by the linear-reading stage which operates in its highest range of sensitivity (corresponding to a negative feedback in which the resistors 22 and 23 are employed in parallel) and by the logarithmic-reading stage. A further voltage which is determined by the resistors 24 and 25 in parallel is applied to the calibration input T of the logarithmic-reading stage in order to ensure continuity of logarithmic reading in spite of the change in sensitivity of the linear-reading circuit.

This instrument therefore permits simultaneous measurement in linear negative feedback and in logarithmic negative feedback with automatic changeover of the ranges of sensitivity of the linear negative feedback.

Figure 3:
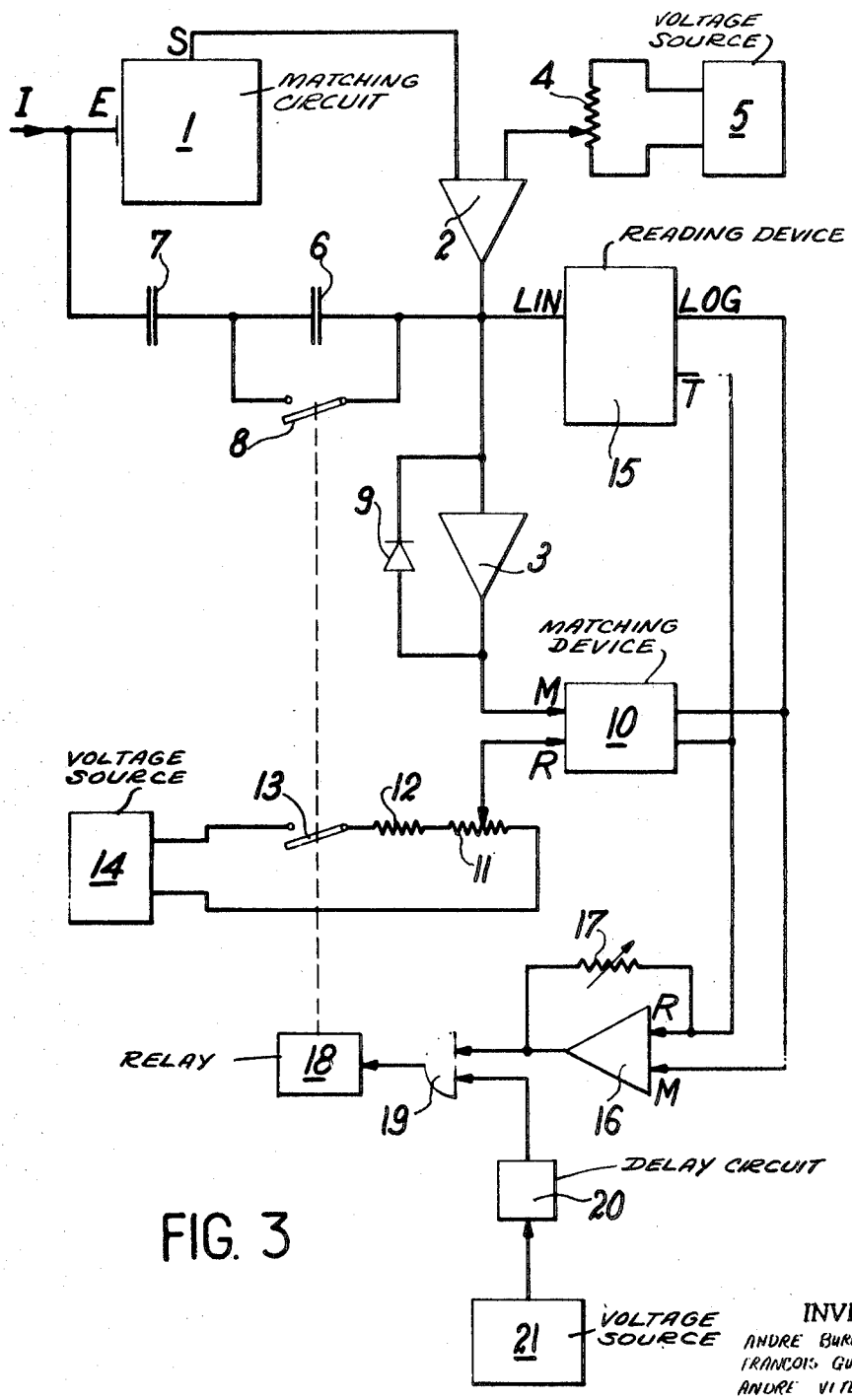
FIG. 3 is a block diagram of an instrument in accordance with the third embodiment.

FIG. 3 is a diagrammatic representation of an instrument in accordance with the third form of embodiment. This instrument permits integration of the electric charges applied to its input and differs from the instrument shown in FIG. 2 only with respect to two points. The common elements are designated by the same reference numerals.

The first difference consists in the replacement of the linear negative feedback chain having resistive elements by an integrating negative feedback chain. Two capacitors 6 and 7 are connected in series between the output of the amplifier 2 and the input E of the impedance matching circuit 1. The respective capacitances $C_1$ and $C_2$ are such, for example, that $C_2=1,000\ C_1$. The switch 8 is connected to the terminals of the capacitor 6 in order to short circuit it.

The second difference which results from the first is as follows: the calibrating potentiometer 11 and the switch 13 are connected in series with a resistor 12 to the terminals of the voltage source 14.

The operation of this instrument is as follows. At the time of initial operation, the relay 18 is not energized and the two switches 8 and 13 remain closed irrespective of the value of the current I which is applied during the period corresponding to the time delay introduced by the circuit 20. If the measured current does not attain a value such that the threshold level of the amplifier 16 is attained, said amplifier does not deliver a cutoff signal to the gate 19 and the relay 18 is energized, with the result that the switches 8 and 13 open. Under the action of the current which is applied to the input $E_1$ of the matching device 1, the capacitors 6 and 7 are then charged respectively at voltages $V_1$ and $V_2$ which are proportional to their capacitances $C_1$ and $C_2$, namely such that $V_1=1,000\ V_2$ and said charge is followed simultaneously by the linear reading stage and by the logarithmic-reading stage of the device 15. On the other hand, if the measured current reaches a value such that the threshold level is attained, the amplifier 16 cuts off the gate 19 and the relay 18 is no longer energized, whereupon the switches 8 and 13 accordingly close.

As a result of the closure of the switch 8, the capacitor 6 is short-circuited and there only remains in service the capacitor 7 which is charged at a voltage equal to one-thousandth of the voltage at which the capacitor 6 was charged. The charge of said capacitor 6 then continues to be followed by the reading device 15 and the linear stage operated in this instance on another sensitivity. As a result of the closure of the switch 13, a voltage is applied to the reference input R of the matching device 10 which delivers to the calibration input T of the logarithmic-reading stage a voltage which has the intended function of ensuring continuity of logarithmic reading in spite of the change in sensitivity of the linear circuit.

The form of construction described in the foregoing has two essential advantages. On the one hand, it eliminates the dead time in the integration of charges over the entire dynamic range of the apparatus irrespective of the duration and repetition frequency of the pulses. Furthermore, after automatic changeover of sensitivity of the linear circuit, this embodiment ensures that the incident pulse which has resulted in threshold overshoot is memorized in the capacitor 7 even if said overshoot has been instantaneous and substantial.

The instrument shown in FIG. 3 which operates as an analog integrator can also quantize the charges received. In this case, another switch is connected to the terminals of the capacitor 7; this switch is also controlled by the relay 18 and the threshold circuit 16 causes simultaneous and temporary short circuiting of the two capacitors 6 and 7 while at the same time causing the electromechanical or electronic digital counter which is connected to its output to advance by one unit. Provision may also be made for a second threshold circuit which is set at a different level in order to short circuit the capacitor 7.

Accounting of the charges collected by the apparatus is thus achieved since the residual charges of the capacitors are always evaluated in the reading device 15.

In the units which are shown in FIGS. 2 and 3, the logarithmic negative feedback chain employs a special temperature-compensated diode 9 but it is apparent that, as in the apparatus of FIG. 1, it would be possible to employ an ordinary diode and then to insert between the potentiometer 11 and the reference input R of the matching device 10 another diode which performs the same function as the diode 31 and ensures compensation for effects due to heating of the diode 9. Moreover, instead of making use of a single diode in the logarithmic negative feedback chain, it would be possible to employ two diodes mounted in top-to-tail relation. Furthermore, there is no limitation in regard to the number of resistors or capacitors which can be inserted in the linear negative feedback circuit or in regard to the ratio of values which depends solely on the possibilities of the reading device. Thus a number of different threshold circuits can in fact each put a resistor into service or short circuit a capacitor. Finally, the input of the threshold circuit 16 can be connected to the output of the linear chain instead of the output of the logarithmic chain.

It is readily understood that the present invention is not limited to the three embodiments which have been illustrated and described by way of example and that the scope of this patent also extends to alternative forms of all or part of the arrangements herein described which remain within the definition of equivalent means as well as to all applications of such arrangements.

What we claim is:

1. An instrument for measuring a signal representative of a DC voltage or current comprising:

an amplifying network having an input and output, at the input of which said signal to be measured is applied;

a linear negative feedback network and a logarithmic negative feedback network connected switchably in parallel between the input and output of said amplifying network;

means, connected to said amplifying network for reading the value of said signal at the output thereof;

means for switching between said linear network and said logarithmic network, whereby one of said networks will be connected between the input and output of said amplifying network to determine the amplifying network parameter;

a threshold circuit responsive to the output of said amplifying network for controlling the operation of said switching means, whereby said linear network will be connected between the input and output of said amplifying network when the output thereof is below a predetermined level and said logarithmic network will be connected between the input and output of said amplifying network when the output thereof is above said predetermined level; and Further amplifying network response-setting means, controlled by said switching means, for maintaining continuity of the value of said signal read on said reading means in spite of the modification of the amplifying network parameters when said switching means switches between said linear and said logarithmic networks.

2. An instrument according to claim 1, wherein said continuity maintaining means comprises a switch connected to said amplifying network, a voltage source and means for providing a linear electrical connection between one side of said switch and said voltage source and means for providing a nonlinear electrical connection between another side of said switch and said voltage source, so as to compensate for the action of said switching means when switching between said linear and said logarithmic networks.

3. An instrument according to claim 2 further including a gated delay circuit connected between said threshold circuit and said switching means for preventing the switching from said logarithmic network to said linear network until a predetermined time after said instrument has been turned on.

4. An instrument according to claim 3, wherein said means for providing a linear electric connection comprises a potentiometer connected to said voltage source and said one side of said switch and said means for providing a nonlinear electrical connection comprises a series connection of a diode and a resistor connected between said voltage source and ground, the junction between said diode and said resistor being connected to said other side of said switch.

5. An instrument in accordance with claim 1, wherein:

the reading means comprises a linear-scale-reading stage and a logarithmic-scale-reading stage, said stages being capable of operating simultaneously, said amplifying network comprises two amplifying circuits, the first circuit being connected to the linear-reading stage and said linear negative feedback network being connected between the input and output thereof, the second amplifying circuit being connected to the logarithmic-reading stage and the logarithmic negative feedback network being connected between the input and output thereof, said linear negative feedback network comprises a plurality of parallel-connectable arms of resistive elements, and said switching means comprises at least one switching device for connecting in parallel different arms of the linear negative feedback network and at least one threshold device for controlling said switching device and connected at the output of one of said first and second circuits of the amplifying network so as to connect predetermined arms of the linear negative feedback network in parallel in response to a predetermined value of the output voltage of said amplifying network.

6. An instrument in accordance with claim 1, wherein:

said reading means comprises a linear-scale-reading stage and a logarithmic-scale-reading stage, said stages being capable of operating simultaneously, said amplifying network comprises two amplifying circuits, the first circuit being connected to the linear-reading stage and said linear negative feedback network being connected between the input and output thereof, the second amplifying circuit being connected to the logarithmic-reading stage and the logarithmic negative feedback network being connected between the input and output thereof, the linear negative feedback network comprises a plurality of capacitive elements in series having different values, and said switching means comprises at least one switching device for short circuiting one of said capacitive elements and at least one threshold device for controlling said switching device and connected at the output of one of said two circuits of said amplifying network so as to short circuit said capacitive element of the linear negative feedback network in response to a predetermined value of the output voltage of said amplifying network.

7. An instrument in accordance with claim 6, further including a digital counter connected to the output of the threshold device for controlling said switching means.

8. An instrument in accordance with claim 5 wherein said continuously maintaining means comprises a voltage source, a plurality of resistors mounted in parallel between said source and said logarithmic-reading stage and at least one switching unit controlled by said threshold device so as to connect predetermined resistors to said logarithmic-reading stage at a predetermined value of the output voltage of said amplifying network, so as to compensate for the effects resulting from switching between the different arms of the linear negative feedback network.

9. An instrument in accordance with claim 1, wherein said amplifying network includes a high-impedance input matching circuit connected at the input thereof for receiving signals to be measured.

10. An instrument in accordance with claim 1, wherein said logarithmic negative feedback network comprises a diode.

11. An instrument in accordance with claim 1, wherein said logarithmic negative feedback chain comprises two diodes mounted in top-to-tail relation.